United States Patent [19]

Sharma et al.

[11] Patent Number: 5,676,912
[45] Date of Patent: Oct. 14, 1997

[54] PROCESS FOR EXHAUST GAS $NO_x$, CO, AND HYDROCARBON REMOVAL

[75] Inventors: Sanjay B. Sharma, Princeton; David S. Shihabi, Pennington, both of N.J.

[73] Assignee: Mobil Oil Corporation, Fairfax, Va.

[21] Appl. No.: 391,859

[22] Filed: Feb. 22, 1995

[51] Int. Cl.⁶ .......................... B01D 53/92; B01D 53/62; B01D 53/72; B01D 53/56
[52] U.S. Cl. .................... 423/213.2; 423/213.7; 423/213.5
[58] Field of Search .................. 423/212, 213.2, 423/213.5, 213.7

[56] References Cited

U.S. PATENT DOCUMENTS

| | | | |
|---|---|---|---|
| 4,961,917 | 10/1990 | Byrne | 423/239 |
| 5,051,244 | 9/1991 | Dunne et al. | 423/213.5 |
| 5,271,913 | 12/1993 | Iida et al. | 423/213.2 |
| 5,284,638 | 2/1994 | Hertl et al. | 423/245.1 |
| 5,310,714 | 5/1994 | Grasselli et al. | 502/64 |
| 5,338,715 | 8/1994 | Iida et al. | 423/212 |

FOREIGN PATENT DOCUMENTS

| | | | |
|---|---|---|---|
| 87056/91 | 5/1992 | Australia | 423/213.2 |
| 460542 | 12/1991 | European Pat. Off. | 423/213.5 |
| 0 510 498 | 4/1992 | European Pat. Off. | |
| 0 593 898 | 9/1993 | European Pat. Off. | |
| 602963 | 6/1994 | European Pat. Off. | 423/213.2 |

*Primary Examiner*—Steven Bos
*Assistant Examiner*—Peter T. DiMauro
*Attorney, Agent, or Firm*—Malcolm D. Keen; Gerald L. Harris

[57] ABSTRACT

There is provided a multizone catalytic process for the treatment of exhaust gas comprising nitrogen oxides, hydrocarbons, and carbon monoxide. In the multizone catalytic process, the exhaust gas is directed through a first zone, a second zone, and a third zone. The first zone comprises a catalyst that is effective for the three-way conversion of nitrogen oxides, hydrocarbons, and carbon monoxide. The second zone comprises materials effective to sorb hydrocarbons, e.g., zeolites ZSM-5 and Beta, particularly iron modified zeolites ZSM-5 and Beta. The second zone is effective for the adsorption of hydrocarbons from the exhaust gas during the cold-start period of operation of an internal combustion engine. The third zone comprises a catalyst that is effective for the oxidation of hydrocarbons and carbon monoxide.

18 Claims, No Drawings

PROCESS FOR EXHAUST GAS $NO_x$, CO, AND HYDROCARBON REMOVAL

FIELD OF THE INVENTION

This invention is directed to a process for the treatment of exhaust gas from internal combustion engines. Specifically included are the adsorption of hydrocarbon emissions during the cold-start operation period of an engine on a solid adsorbent, the desorption of the adsorbed hydrocarbons, and the coversion during the warm-running period of hydrocarbons, nitrogen oxides, and carbon monoxide that are present in the exhaust gas.

BACKGROUND OF THE INVENTION

Internal combustion engines emit a large amount of unburned hydrocarbons during cold engine start-up. In fact, a substantial fraction of the total emitted hydrocarbons found to be released during the first minutes of engine operation are due to the uncombusted hydrocarbons in the rich fuel mixture.

Low molecular weight hydrocarbons are especially troublesome as pollutants because they form ozone. Emission standards for low molecular weight hydrocarbons are becoming more stringent.

Release of hydrocarbons after start-up of an engine poses a special problem because at this point the temperatures of the exhaust gas and the catalytic converter are not high enough for the conversion of gaseous pollutants to innocuous products in the presence of conventional catalysts. The catalysts used in catalytic converter systems are generally ineffective at ambient temperature and must reach high temperatures, often in the range of 300° to 400° C. before they are effective.

Exhaust gas from an engine after cold start-up also contains nitrogen oxides along with carbon monoxide and hydrocarbons. Currently, this exhaust gas is typically treated using what is known as a three-way catalyst, which is effective to simultaneously reduce nitrogen oxides while oxidizing carbon monoxide and hydrocarbons. This catalyst typically requires the use of relatively expensive rhodium and other transition metals. This catalyst is also not effective for removing the hydrocarbons produced during the cold-start period of engine operation (e.g., while the exhaust gas and catalyst are cold).

It is desired to develop a process for treating engine exhaust gas that is effective to reduce the amount of hydrocarbons discharged into the atmosphere during the cold-start period of engine operation and that is also effective for reducing the amount of nitrogen oxides, hydrocarbons, and carbon monoxide discharged from the engine during the warm-running period, e.g., after the cold-start period has been completed.

SUMMARY OF THE INVENTION

It is desired to develop a process for treating engine exhaust gas that is effective to reduce the amount of hydrocarbons discharged into the atmosphere during cold engine start-up and that is also effective to reduce the amount of nitrogen oxides, hydrocarbons, and carbon monoxide discharged from the engine after the cold-start period has been completed.

It has been found that zeolites ZSM-5 and Beta, especially when treated by iron or an iron containing compound to contain or incorporate specified amounts of iron and then hydrothermally treated under specified conditions, are effective for hydrocarbon adsorption and further are unusually hydrothermally stable. The special properties of these zeolites may be advantageously used in the treatment of exhaust gas produced by an internal combustion engine. The unusual hydrothermal stability of zeolites treated according to the method of this invention is particularly beneficial in processes like the treatment of internal combustion engine exhaust gas, where the zeolites are subject to thermal cycling and are possibly subject to high temperatures.

This invention is directed to a method using a multizone catalytic system to treat an engine exhaust gas. In particular, this method is useful for reducing hydrocarbon emissions during the cold-start operating period of an internal combustion engine while providing the capability to reduce hydrocarbon, nitrogen oxide and carbon monoxide emissions during the warm-running operating period after the completion of the cold-start operating period. This invention contacts the exhaust gas using a multizone catalytic system comprising a first zone, a second zone, and a third zone. The first zone comprises a conventional three-way catalyst. The second zone comprises an adsorber-adsorbent bed that is suitable for trapping and delaying hydrocarbons, e.g., $C_1$ to $C_5^+$ hydrocarbons. Zeolites ZSM-5 and Beta are suitable for use in this zone. The third zone comprises an oxidation catalyst which is effective for oxidizing hydrocarbons and carbon monoxide.

According to the method of this invention, the second zone materials are capable of adsorbing hydrocarbons when operated in an exhaust gas temperature range that is suitable therefore.

In one embodiment, zeolites ZSM-5 and Beta, especially catalysts consisting essentially of iron modified ZSM-5 and iron modified Beta, may be used along with a conventional three-way catalyst and an oxidation catalyst to adsorb the hydrocarbons that are emitted during the cold-start period of engine operation. In this embodiment, an undiverted stream of engine exhaust gas is first directed over the three-way catalyst, then, optionally combined with air, and directed over the zeolites ZSM-5 and Beta, and finally over the oxidation catalyst, e.g., undiverted refers to operation with no valves or gas flow controls between the zones. The hydrocarbons are adsorbed by the zeolites while the exhaust gas and zeolite temperatures are low (e.g., less than about 300° C. or lower such as less than about 250° C. or even 200° C., then as the exhaust gas and zeolite temperature increases, the hydrocarbons desorb, are stripped, are converted, or are combusted off of the zeolites at about the same time that the three-way and oxidation catalysts become active, e.g., "light off," for removal of exhaust gas pollutants, e.g., hydrocarbons, carbon monoxide, and nitrogen oxides, among others. In this embodiment, the zeolites ZSM-5 and Beta are primarily used as hydrocarbon adsorbents during the cold-start period of engine operation, however they are also effective for hydrocarbon oxidation during the warm-running period of operation.

An advantage of the process of this invention is the use of at least two hydrothermally stable zeolites to adsorb hydrocarbons from the exhaust gas produced by an engine during the cold-start period, particularly zeolites that are effective to adsorb hydrocarbons of different molecular sizes. Another advantage associated with the process of this invention is that the hydrocarbons passing over the three-way catalyst of the first zone provide fuel for combustion and heat release on the catalyst in that zone. This heat release from hydrocarbon combustion is useful to quickly heat that catalyst up to operating temperature. If the process of this invention included the hydrocarbon adsorbents ahead of the three-way catalyst, this advantage would be lost, because the three-way catalyst would experience an environment deficient in hydrocarbons and hence would be slower to heat up after the cold-start period.

An embodiment of this invention is a process for continuously removing one or more nitrogen oxides, carbon monoxide, and hydrocarbons from the exhaust gas from an internal combustion engine, the process comprising a cold-start stage and a warm-running stage, wherein the cold-start stage comprises the steps of: (a) passing the exhaust gas from a time beginning from the start of the engine into a first zone comprising a first catalytic material which is capable of reducing the nitrogen oxides, oxidizing the carbon monoxide, and oxidizing the hydrocarbons, wherein the exhaust gas is contacted with the first catalytic material during the cold-start stage, under reaction conditions during the beginning of the cold-start stage that are not sufficient to oxidize a majority of the hydrocarbons in the exhaust gas; (b) passing the effluent from step (a) to a second zone comprising a sorbent material capable of sorbing hydrocarbons, wherein the effluent from step (a) is contacted with the sorbent under conditions sufficient to sorb hydrocarbons in the effluent from step (a); and (c) passing the effluent from step (b) to a third zone comprising a second catalytic material which is capable of oxidizing hydrocarbons, wherein the cold-start stage transitions into the warm-running stage when the temperature in the first zone increases to a temperature sufficient to promote the oxidation of hydrocarbons in the first zone, the warm-running stage comprising the steps of: (d) passing the exhaust gas from the engine into the first zone, wherein the exhaust gas is contacted with the first catalytic material under reaction conditions sufficient to (i) reduce nitrogen oxides and (ii) oxidize carbon monoxide, wherein the reaction conditions during the warm-running stage are sufficient to oxidize a majority of the hydrocarbons in the exhaust gas; (e) passing the effluent from step (d) to the second zone, wherein the effluent from step (d) is contacted with the sorbent material under conditions sufficient to desorb at least a portion of the hydrocarbons sorbed on the sorbent during step (b); and (f) passing the effluent from step (e) to the third zone, wherein the effluent of step (e) is contacted with the second catalytic material under conditions sufficient to oxidize hydrocarbons desorbed from the sorbent in step (e).

DETAILED DESCRIPTION OF THE INVENTION

The term "exhaust gas" as used herein means any waste gas which is formed in an industrial process or operation and which is normally disposed of by discharge to the atmosphere, with or without additional treatment. "Exhaust gas" especially includes the gas produced by internal combustion engines. The composition of such a gas varies and depends on the particular process or operation which leads to its formation. When formed in the combustion of fossil fuels, it will generally comprise nitrogen, steam and carbon dioxide in addition to low levels, such as up to about 5000 ppm. of nitric oxide plus nitrogen dioxide. Sulfur-containing fuels will typically produce an exhaust gas that contains one or more sulfur oxides, such as $SO_2$. Rich fuel-air mixtures will generally produce an exhaust gas that contains little if any free oxygen along with some carbon monoxide. Lean fuel-air mixtures, i.e., mixtures in which more air is provided than is stoichiometrically required to completely burn the fuel, will form an exhaust gas that contains gaseous oxygen. The foregoing is a general description given to illustrate the variability in the composition of the exhaust gases from fossil fuel combustion. Other industrial processes such as nitration, uranium recovery, and calcining nitrate salt containing solids produce exhaust gases which can have compositions different from those noted above. They may be substantially devoid of steam, for example, and may contain very high concentrations of nitrogen or other inert gases.

One aspect of this invention includes a method for treating exhaust gas, which comprises $NO_x$, CO, hydrogen, and one or more hydrocarbons using a multizone catalytic system. The multizone catalytic system typically includes at least a first catalyst, an adsorbent, and a second catalyst and may also include other catalytic zones, heat exchange zones or gas adsorption/absorption zones as desired.

As mentioned above, the method of this invention provides a catalytic system that traps and delays hydrocarbons during the cold-start stage or period of engine operation and that simultaneously reduces nitrogen oxides and oxidizes hydrocarbons and carbon monoxide after the temperature of the exhaust gas increases, e.g., the warm-running stage or period of engine operation. The multizone catalytic system includes a first zone containing a first catalyst, a second zone containing a hydrocarbon sorbent, e.g., zeolites ZSM-5 and Beta, and a third zone containing a second catalyst. The first catalyst comprises a three-way conversion catalyst (three-way catalyst), e.g., one that is effective for the simultaneous reduction of nitrogen oxides and oxidation of hydrocarbons and carbon monoxide. The zeolites ZSM-5 and Beta are typically impregnated, contacted with, or modified to contain iron or an iron compound, e.g., iron oxide, and then are hydrothermally treated. The second catalyst is one that is effective to oxidize hydrocarbons and carbon monoxide and, typically is different from the first catalyst. The second catalyst typically does not include components effective for a the reduction of a significant amount of nitrogen oxides while the desired hydrocarbon oxidation is occurring, e.g., the second catalyst is substantially free of rhodium.

According to the method of this invention, any carbon monoxide and hydrocarbons present in the exhaust gas may be oxidized to carbon dioxide and water over the first catalyst, over the zeolites ZSM-5 and Beta, over the second catalyst, and over any other catalysts present. Additionally, hydrocarbons may be selectively absorbed/adsorbed on one or more of the first catalyst, the zeolites ZSM-5 and Beta, the second catalyst and any other catalyst present in the system.

Each of the principal features of this invention will be more fully described below.

Feeds

This invention is effective to treat industrial and engine exhaust gases to remove $NO_x$, and optionally other undesirable compounds, such as CO and hydrocarbons, if present. These exhaust gases are typically produced in internal combustion engines, and coal or gas-fired or oil-fired furnaces, boilers and incinerators, and by the manufacture of nitric acid, by the nitration of organic chemicals, and by other chemical operations such as the reprocessing of spent nuclear fuel rods by dissolution in nitric acid to recover uranyl nitrate followed by calcination to convert the nitrate to uranium oxide.

Process Conditions

The exhaust gas is typically treated in the catalytic system of this invention at a temperature of about ambient up to about 1,000° C. or more, e.g., at about ambient to about 900° C., e.g., about ambient to about 750° C., e.g., about ambient to 499° C. and at a gas hourly space velocity, GHSV, (vols. of gas at STP per volume of catalyst per hour) adjusted to provide the desired conversion. The GHSV can be from about 1,000 to about 500,000 hr$^{-1}$, e.g., from about 2,500 to about 250,000 hr$^{-1}$, e.g., from about 5,000 to about 150,000 hr$^{-1}$, e.g., from about 10,000 to about 100,000 hr$^{-1}$. The process of this invention is operable at subatmospheric to superatmospheric pressure, e.g. at about 5 to about 500 psia, and e.g., at about 10 to about 50 psia, i.e. near or slightly above atmospheric pressure.

Adequate conversion in each catalytic zone may be readily achieved with a simple stationary fixed-bed of catalyst. However, other contacting means are also contemplated, such as contacting with a fluid bed, a transport bed, and a monolithic catalyst structure such as a honeycomb.

Suitable mixing may be used before each zone of this invention to produce a homogeneous gas mixture for treatment in that zone. The mixers may be any suitable arrangement, including, for example, baffles, discs, ceramic discs, static mixers or combinations of these. The mixing may also be integral with the gas flow paths as described herein.

In the method of this invention, air may be co-fed to the second zone, e.g., over the zeolites ZSM-5 and Beta, along with the effluent from the first zone. The effluent from the first zone is typically mixed with the air, before being directed to the second zone. Introduction of air between the zones provides a method of cooling the exhaust gas to reduce the operating temperature of the sorbent, e.g., zeolites, used in the second zone. This cooling will tend to extend the lifetime of the zeolites and will increase the time required for the desorption of the adsorbed hydrocarbons. A suitable operating temperature for the second zone is between about ambient and 499° C., however other temperatures as recited above are also effective. Air injection ahead of the zeolites also tends to facilitate removal, conversion or oxidation of any hydrocarbons remaining on the zeolites after the transition from the cold-start stage of engine operation to the warm-running stage of engine operation.

After the exhaust gas leaves the second zone, it is directed to the third zone for oxidation of any hydrocarbons and carbon monoxide remaining in the gas. This zone is particularly effective to oxidize any hydrocarbons that desorb from the zeolites as they heat up during the warm-running stage of engine operation, e.g., after the initial cold-start stage of engine operation.

In an embodiment of the invention, the exhaust gas is directed in undiverted flow through a first zone, containing a first catalyst, then through a second zone, containing a hydrocarbon sorbent, e.g., zeolites ZSM-5 and Beta, and finally through a third zone, containing a second catalyst. In this embodiment, the first catalyst comprises a three-way exhaust gas conversion catalyst that is effective to catalyze the simultaneous reduction of nitrogen oxides and the oxidation of hydrocarbons and carbon monoxide. The zeolites are each effective for hydrocarbon adsorption, e.g., typically, the ZSM-5 is effective to adsorb hydrocarbons having from about one to about ten carbon atoms and the zeolite Beta is effective to adsorb hydrocarbons containing from about five to about twelve carbon atoms. The zeolites typically comprise ZSM-5 and Beta, e.g., iron modified ZSM-5 and iron modified Beta, e.g., consist essentially of iron modified ZSM-5 and iron modified Beta that have been hydrothermally treated after the iron addition. The second catalyst comprises a catalyst that is effective to catalyze hydrocarbon and carbon monoxide oxidation, e.g., a supported metal or metal compound, such as at least one of the metal or metal compounds of copper, zinc, vanadium, chromium, manganese, iron, cobalt, nickel, palladium, platinum, molybdenum, tungsten, lanthanum, ruthenium, rhenium, iridium, cerium and mixtures thereof, with the noble metals, platinum, palladium and combinations of these, along with cerium, particularly preferred.

In an embodiment of this invention, during the cold-start stage of engine operation, before the three-way catalyst has achieved "light off" or is fully effective, e.g., before this catalyst is effective to remove a majority, e.g., at least about 50%, of the hydrocarbons present in the exhaust gas, e.g., at exhaust gas and/or catalyst system temperatures below about 300° C., e.g., below about 250° C. or even below about 200° C., the zeolites are effective to adsorb hydrocarbons present in the exhaust gas. As the exhaust gas and/or the catalyst system temperatures increase above catalyst "light off" conditions and the system transitions into the warm-running stage, e.g., at exhaust gas and/or catalyst system temperatures where the three-way catalyst is capable of removing a majority, e.g., at least about 50%, of the hydrocarbons present in the exhaust gas, e.g., at temperatures greater than about 200° C., e.g., greater than about 250° C. or even greater than 300° C., the adsorbed hydrocarbons begin to be converted, oxidized, or to desorb from the zeolites and are converted, at least in part, by the oxidation catalyst and/or the zeolites. As mentioned earlier, according to the method of this invention, the three-way catalyst contacts the exhaust gas before the hydrocarbon sorbent does. This flow configuration advantageously facilitates the rapid heat up of the three-way catalyst as hydrocarbons and other combustibles ignite over the three-way catalyst.

Air may be combined with the exhaust gas as it is leaving the three-way catalyst and is directed to the second zone, primarily for temperature control. It is generally desired to keep the temperature of the exhaust gas that in the second zone below about 1000° C., e.g., below about 900° C., e.g. below about 700° C., e.g., below 500° C. The exhaust gas generally flows directly from the engine to the three-way catalyst, then over the zeolites, then to the oxidation catalyst with no intervening valves, flow control means, or other flow impediments except the above mentioned air injection and gas mixing devices. Valves may be used if desired, particularly to isolate the second and third zones from the exhaust gas flow after the catalyst system is operating in the warm-running stage and after the desired amount of the adsorbed hydrocarbons has been removed from the second zone adsorbents.

To allow a high degree of conversion of nitrogen oxides, hydrocarbons and carbon monoxide over the three-way catalyst, the exhaust gas contacting the three-way catalyst should contain a redox ratio of about 1, e.g., between about 0.9 and about 1.1. The mole ratio of reducing agents, such as the carbon monoxide, hydrogen, and hydrocarbon components of the exhaust gas, to oxidizing agents, such as the $NO_x$ and oxygen components of the exhaust gas, is commonly referred to as the redox ratio. The redox ratios are average figures. These ranges are commonly referred to as the redox ratio window. In an internal combustion engine, this ratio is controlled by regulating the amount of air to the fuel, which is called the air to fuel ratio. In lean burn engines, that is, those in which the redox ratio is on the low side due to excess air or lower fuel content in the combustion mixture, the ratio can be adjusted by adding reducing agents, such as non-combusted fuel, hydrogen, and carbon monoxide, to the first portion of the exhaust gas. In exhaust gases from fired heaters, the redox ratio is typically lower than the operating ranges desirable in this invention, and therefore, to adjust the redox ratio to the proper levels, reducing agents such as non-combusted fuel, carbon monoxide, or hydrogen can be added to the first portion of the exhaust gas. The redox ratio desired for this embodiment may be achieved in the engine exhaust gas using conventional engine management systems and an exhaust gas oxygen sensor. The air addition between the first zone and the second zone is also effective to decouple the redox ratios of the zones and to promote oxidation of any residual hydrocarbons and carbon monoxide present in the exhaust gas at that point over the zeolites and/or the oxidation catalyst.

Catalyst Composition

Catalysts useful in this invention typically comprise an active material and a support. Suitable supports include a washcoat ceramic monolith, a monolith formed of the catalytic material, e.g., zeolite in the case of the second catalyst, or a washcoat corrugated metal monolith. The support for the catalysts of this invention may be the same as the active material and further can be a synthetic or naturally occurring substance as well as an inorganic material such as clay, silica and/or one or more metal oxides. The latter may be either naturally occurring or in the form of gelatinous precipitates or gels including mixtures of silica and metal oxides. Naturally occurring clays which can be used as support for the catalysts include those of the montmorillonite and kaolin families, which families include the subbentonites and the kaolins commonly known as Dixie, McNamee, Georgia and Florida clays or others in which the main mineral constituent is halloysite, kaolinite, dickite, nacrite or anauxite. Such clays can be used in the raw state as originally mined or initially subjected to calcination, acid treatment or chemical modification. In addition to the foregoing materials, the catalysts of this invention may be supported on a porous binder or matrix material, such as alumina, titania, zirconia, silica-alumina, silica-magnesia, silica-zirconia, silica-thoria, silica-berylia, silica-titania, titania-zirconia, as well as ternary compounds such as silica-alumina-thoria, silica-alumina-zirconia, silica-alumina-magnesia, and silica-magnesia-zirconia. A mixture of these components could also be used. The support may be in the form of a cogel. Typical aluminas useful as supports in this invention include alpha ($\alpha$) alumina, beta ($\beta$) alumina, gamma ($\gamma$) alumina, chi-eta-rho ($\chi,\rho,\eta$) alumina, delta ($\delta$) alumina, theta ($\theta$) alumina, and lanthanum beta ($\beta$) alumina, with gamma alumina particularly preferred. The preferred support is one that is a high surface area material that also possesses a high temperature stability and further possesses a high oxidation stability.

The binder may be prepared according to U.S. application Ser. No. 08/112,501, now U.S. Pat. No. 5,430,000 incorporated by reference herein, or may be prepared according to methods disclosed in U.S. Pat. Nos. 4,631,267; 4,631,268; 4,637,995; and 4,657,880, each incorporated by reference herein. Also, the catalysts described herein may be combined with any of the binder precursors described in the above application and patents, and then may be formed, such as by extrusion, into the shape desired, and then hydrothermally treated and/or calcined as hereinafter described.

When low acidity titania is used as a binder, it is essential that the formable, e.g., extrudable, mass prepared by combining the active material and the titania binder precursors contain at least about 0.5 wt. %, typically from about 1 wt. % to about 20 wt. %, e.g., from about 2 to about 8 wt. % of the aqueous slurry of titanium oxide hydrate.

The low acidity titania is typically added in dry particulate form, e.g., titanium oxide hydrate, so as to control the moisture content of the binder/dispersant mixture at a level to promote satisfactory forming, e.g., extrusion.

The catalysts may also contain stabilizers such as alkaline earth oxides, phosphates and combinations thereof.

Catalysts of this invention are frequently used with a substrate. A material can be both substrate and part of the catalyst. Suitable substrate materials include cordierite, nitrides, carbides, borides, intermetallics, mullite, alumina, natural and synthethic zeolites, lithium aluminosilicate, titania, feldspars, quartz, fused or amorphous silica, clays, aluminates, zirconia, spinels, or metal monoliths of aluminum-containing ferrite type stainless steel, or austenite type stainless steel, and combinations thereof. Typical substrates are disclosed in U.S. Pat. Nos. 4,127,691 and 3,885,977, incorporated by reference herein. The catalyst is combined with the substrate in any method that ensures that the catalyst will remain intact during the catalytic reaction. For example, the catalyst may be present as a coating on the substrate, or it can be present as an integral part of the substrate. Additionally, as mentioned earlier, the substrate and at least part of the catalyst may be the same. For example, in some embodiments, zeolites may be used as both catalysts and substrates. When the catalyst of this invention is deposited on the substrate, it is typically done using a wash coat. The wash coat may be prepared, for example, by adding silica sol and water to the catalyst powder, mulling the mixture to form a thixotropic slurry, dipping the monolithic substrate into the slurry, and then drying and calcining the resulting structure. Alternatively, the catalyst may be formed and extruded together with the substrate and thus may become an integral part of the substrate.

The form and the particle size of the catalysts are not critical to the present invention and may vary depending, for example, on the type of reaction system employed. Non-limiting examples of the shapes of the catalyst for use in the present invention include balls, pebbles, spheres, extrudates, channeled monoliths, honeycombed monoliths, microspheres, pellets or structural shapes, such as lobes, pills, cakes, honeycombs, powders, granules, and the like, formed using conventional methods, such as extrusion or spray drying. Where, for example, the final particles are designed for use as a fixed bed, the particles may preferably be formed into particles having a minimum dimension of at least about 0.01 inch and a maximum dimension of up to about one-half inch or one inch or more. Spherical particles having a diameter of about 0.03 inch to about 0.25 inch, e.g., about 0.03 inch to about 0.15 inch, are often useful, especially in fixed bed or moving bed operations. With regard to fluidized bed systems, it is preferred that the major amount by weight of the particles have a diameter in the range of about 10 microns to about 250 microns, e.g., about 20 microns to about 150 microns.

First Zone

As mentioned earlier, the first zone comprises a three-way catalyst. The three-way catalyst may be any catalyst that is capable of the simultaneous reduction of nitrogen oxides and oxidation of carbon monoxide and hydrocarbons. Suitable three-way catalysts include noble metals, e.g., Pt, Pd, Rh, and combinations thereof, on alumina, ceria, lanthana, zirconia, yttria, and combinations thereof. Typical three-way catalysts include Pt on ceria-alumina combined with Rh on zirconia or ceria-zirconia. The Pt-ceria-alumina and Rh-zirconia components may be combined and applied at once, as in a single coating, or they can be applied in separate coatings. Another suitable catalyst is Pt/Pd/Rh on about 70% gamma alumina combined with about 30% rare earth oxide, such as ceria. The (Pt+Pd):Rh ratio is typically about 5:1 to about 10:1, including a Pt:Pd ratio of about 1:1 to about 3:2. The total precious metal loading is typically about 30–60 g per ft$^3$ of substrate. The three-way catalyst may also include one or more oxides of base metals, such as nickel, cobalt, manganese, iron, rhenium or combinations thereof. These base metals are useful to suppress the formation of hydrogen sulfide, among other functions. Also, the three-way catalyst ma be stabilized through the use of zirconia, titania, alkaline earth metal oxides, such as baria, calcia, strontia, or rare earth metal oxides, such as ceria, lanthana, and mixtures thereof. Rhodium is particularly effective in the three-way catalysts to catalyze the reduction of nitrogen oxides and the catalysts typically contain sufficient rhodium to avoid conversion of nitrogen oxides to ammonia.

Second Zone

The gas mixture formed leaving the first zone is combined with a source of oxygen, e.g., air, and is contacted with zeolites ZSM-5 and Beta in a second zone, e.g., iron modified ZSM-5 and iron modified Beta, particularly hydrothermally treated, iron modified ZSM-5 and hydrothermally treated, iron modified Beta, e.g., a second zone consisting essentially of hydrothermally treated, iron modified ZSM-5 and hydrothermally treated, iron modified Beta.

Zeolite ZSM-5 is described in U.S. Pat. Nos. 3,702,886 and Re. 29,948, incorporated by reference herein. Zeolite Beta is described in U.S. Pat. Nos. 3,308,069; 4,642,690; 5,164,170; 5,232,579; and Re. 28,341, each incorporated by reference herein.

The second zone zeolite may include a support and may be used with a substrate. In accordance with one embodiment, the zeolite may be brought into contact with a monolithic ceramic substrate by crystallizing the zeolite on the surface of the substrate, as disclosed in U.S. Pat. No. 4,800,187, incorporated herein by reference. The zeolite may also be formed into the substrate, such as by extrusion.

One second zone material is prepared by combining the zeolites, such as hydrogen form ZSM-5 and/or Beta, a source of iron, such as an iron salt, a high molecular weight, hydroxy functional silicone, such as Dow Corning Q6-2230 silicone resin, a suitable extrusion aid, such as methyl cellulose, and a suitable carrier, such as methanol, ethanol, isopropyl alcohol, N-methyl pyrrolidone or a dibasic ester along with water as needed, then forming the mixture into the desired shape, such as by extrusion, then simultaneously calcining and hydrothermally treating the formed material. One particular methyl cellulose that is effective as an extrusion aid in the method of this invention is a hydroxypropyl methyl cellulose, such as K75M Methocel™, available from Dow Chemical Co. Dibasic esters that are useful in this invention include dimethyl glutarate, dimethyl succinate, dimethyl adipate, and mixtures thereof, one example of which is DuPont Chemical Co. DBE, which typically comprises about 50 to 75 percent dimethyl glutarate, 10 to 25 percent dimethyl adipate, 19 to 26 percent dimethyl succinate and less than about 0.2 wt. % methanol. Other silicone resins that may be used in the method of this invention include those described in U.S. Pat. No. 3,090,691.

The relative proportions of zeolite components and the support material on an anhydrous basis may vary widely with the zeolite content ranging from between about 5 to about 99 percent by weight and more usually in the range of about 10 to about 95 percent by weight, e.g., from about 20 to about 90 percent by weight of the dry composite. The zeolite ZSM-5 and zeolite Beta of the present invention are frequently supported or bound using silica, titania, or zirconia.

Original ions, e.g., alkali or alkaline earth metal, of the as-synthesized zeolite and any found in the zeolite/support material can be replaced in accordance with techniques well known in the art, at least in part, by ion-exchange with other ions. For the present catalyst composition, preferred replacing ions include hydrogen ions and hydrogen precursor, e.g., ammonium ions. ZSM-5 in the hydrogen exchanged form is referred to herein as HZSM-5. Typical ion-exchange techniques would be to contact the zeolite or zeolite/support material with a solution containing a salt of the desired replacing ion or ions. Examples of such salts include the halides, e.g., chlorides, nitrates and sulfates. Representative ion-exchange techniques are disclosed in a wide variety of patents including U.S. Pat. Nos. 3,140,249; 3,140,251; and 3,140,253, incorporated by reference herein.

As mentioned above, second zone materials useful in this invention comprise zeolites ZSM-5 and Beta that have been contacted with iron or an iron compound under conditions effective to achieve the desired iron loading and distribution on the zeolites. The iron may be added by ferrocene impregnation, ion-exchange, contacting the zeolite with an inorganic iron-containing salt or salt precursor, contacting the zeolite with another type of inorganic iron-containing compound, e.g., iron oxide, or the iron may be incorporated in the in-situ production of the zeolite from zeolite seeds, silica, and a crystalline silicate. The desired iron loading on ZSM-5 is about 0.01 to about 5 wt. %, e.g., about 0.4 to about 4 wt. %, e.g., about 0.6 to about 3.5 wt. %, e.g., about 1 to about 3 wt. %, e.g., about 1.5 to about 3 wt. %, e.g., about 1.5 to about 3 wt. %, e.g., about 2 to 3 wt. % based upon the zeolite. The desired iron loading on zeolite Beta is about 0.01 to about 4 wt. %, e.g., about 0.4 to about 3 wt. %, e.g., about 0.6 to about 2 wt. %, e.g., about 0.6 to about 1.5 wt. %, e.g., about 1 wt. % based upon the zeolite. The zeolites may also optionally include another metal or metal compound, such as a transition metal, preferably a noble metal, the combination of the metals which is able to oxidize undesirable compounds present in the exhaust gas or to tailor the adsorption capability of the zeolite as desired or to improve the stability of the zeolite. The metal compound may be at least one of copper, chromium, manganese, cobalt, nickel, palladium, platinum, molybdenum, tungsten, sodium, potassium, magnesium, calcium, barium, cerium, and mixtures thereof.

After the zeolites have been contacted with iron or an iron compound, they may be washed with water and dried at a temperature ranging from about 65° C. to about 315° C. and thereafter calcined or thermally treated in air, or in an inert gas, at temperatures ranging from about 260° C. to about 925° C. for periods of time ranging from about 1 to about 48 hours or more. While subatmospheric or superatmospheric pressure can be employed for the thermal treatment, atmospheric pressure is preferred simply for reasons of convenience. Catalysts of improved stability, selectivity and other beneficial properties can be obtained by subjecting the iron contacted zeolite to at least one treatment with streams containing steam (hydrothermally treating the catalysts) at elevated temperatures ranging from about 260° C. to about 900° C., e.g., from about 400° C. to about 850° C., e.g., at about 650° C. or at about 750° C. The hydrothermal treatment may be accomplished prior to use in the process, in an atmosphere of up to about 100% steam in air or some other suitable gas stream or in an atmosphere consisting of steam or nitrogen and some other gas which is essentially inert to the zeolite. Optionally, more than one hydrothermal treatment may be used, e.g., two, three, or more hydrothermal treatments at the same or different temperatures, e.g., increasing temperatures, may be used. Typical steaming conditions are described in U.S. Pat. Nos. 4,429,176; 4,522, 929; 4,594,146; and 4,663,492; each incorporated by reference herein. The calcination and hydrothermal treatment of the catalysts are preferably combined into one treatment step.

Ferrocene impregnated catalysts useful in this invention may be prepared by impregnating the zeolite with ferrocene which has been dissolved in a suitable solvent. Suitable solvents are those which dissolve the ferrocene and may then be removed from the impregnated zeolite under conditions sufficiently mild as to avoid causing the ferrocene to sublimate off the zeolite. Examples of suitable organic solvents include benzene, toluene, xylenes, and hexane among others. The impregnation is typically conducted for more than about 4 hours, e.g., from about 4 hours to several days, e.g., from about 6 hours to about 100 hours. The impregnation is generally conducted at conditions effective to put the desired amount of iron onto the zeolite.

The impregnation may occur either before or after the zeolite is combined with the support. For example, if the zeolite is first combined with the support and then impregnated, ferrocene that is deposited on the surface of the zeolite and on the support may be washed off using a solvent having an effective atomic diameter that is larger than the zeolite pore size, e.g., an organic solvent such as Tetralin® for ZSM-5.

The impregnation may be conducted after first drying or dehydrating the zeolite. Also, the ferrocene solution may be prepared using a water-free or dry solvent.

The impregnated zeolite is recovered by removing the solvent from the zeolite. It is desired to remove the solvent without causing the ferrocene to sublimate off the zeolite. One possible way is to evaporate the solvent at a temperature less than the ferrocene sublimation temperature, 100° C. This solvent removal may be done at superatmospheric pressure, if desired, or pressures ranging from subatmospheric to atmospheric. The recovered ferrocene impregnated zeolite is then typically calcined at about 450° C. to about 550° C. to oxidize the ferrocene and to convert the iron to its oxide.

Another second zone material useful in this invention comprises a zeolite which has been exposed to at least one ion-exchange sequence, wherein the ion-exchange sequence comprises the steps of contacting the intermediate pore size zeolite with an aqueous solution of a ferrous, Fe(II), salt under inert conditions, recovering the zeolite, and calcining the zeolite. The inert conditions are those effective to substantially prevent oxidation of the ferrous ion to the ferric form, such as using nitrogen, argon and the like inert gases to blanket the solution. For ZSM-5, the ion-exchange is typically conducted with stirring or mixing at a temperature of above about 55° C., e.g., above about 65° C., or those temperatures effective to reduce the hydration sphere of the ferrous cation to a size small enough to enter the pores of the zeolite. The ferrous cation is reported to have an ionic radius in an aqueous solution of about 6 Å at 25° C., which is too large to enter ZSM-5 pores, which are slightly smaller than this. Increasing temperature is believed to reduce the size of the hydration sphere associated with the ferrous cation. For example, with increasing temperature, a ferrous compound, ferrous sulfate, changes from the heptahydrate form to the tetrahydrate form (at 56.6° C.) and then to the monohydrate form (at 65° C.).

The ion-exchange is typically conducted for more than about 4 hours, e.g., from about 4 hours to several days, e.g., from about 6 hours to about 100 hours. During the ion-exchange, the pH of the aqueous solution is typically maintained between about 1 and about 4.5 or at a pH level effective to prevent precipitation of the ferrous salt.

It has been found that ferrous, Fe(II), ions are more readily exchanged into the zeolite than ferric, Fe(III), ions.

Ferrous, Fe(II), salts useful in this invention include the water soluble salts, such as, ferrous ammonium sulfate, ferrous chloride, ferrous fluosilicate, ferrous hyposulfite, ferrous iodide, ferrous lactate, ferrous nitrate, ferrous perchlorate, ferrous sulfate, and ferrous thiocyanate.

After the iron has been ion-exchanged into the zeolite, the zeolite is typically recovered by cooling the aqueous solution below about 55° C. to about 65° C., filtering the zeolite from the aqueous solution and washing the filtered zeolite with a neutral or slightly basic solvent, for example, an aqueous solvent with a pH of from about 6 to about 9, such as distilled or deionized water. The solvent washing is conducted at conditions effective to avoid leaching the iron from the zeolite. The aqueous solution and the ion-exchanged zeolite need not be maintained under inert conditions after the solution has been cooled. The recovered zeolite may be dried, calcined or hydrothermally treated as more fully described herein. The ion-exchange sequence described above is typically conducted at least once.

Another method to incorporate iron onto the zeolite is to contact the zeolite with an iron salt or salt precursor. In this method, the iron salt may first be dissolved in water or another suitable solvent and then the zeolite may be contacted with the solution. Alternatively, the iron salt and the zeolite, and any binder material desired, may be physically combined or admixed and then water or another suitable solvent added and the mixture recovered and formed, as desired. The formed material may be dried, calcined, or hydrothermally treated as is more fully described herein. As will be apparent to one skilled in the art, any method that is effective to contact the zeolite with the iron salt may be used, including, but not limited to an incipient wetness technique.

Suitable iron salts include all of the ferrous salts mentioned above, ferric acetylacetonate, ferric ammoniumchloride, ferric chloride, iron (III) nitrate nanohydrate, iron (III) sulfate pentahydrate, ammonium ferric sulfate, ferric bromide, ferric iodide, and any other ferrous, ferric or other iron salts that are water soluble. Also included are precursors of all of the salts mentioned above.

Yet another method that is suitable to add iron to the zeolite is to physically contact the zeolite with an inorganic iron-containing compound, e.g., iron oxide. In this method, it is preferred to use a finely divided iron-containing compound, such as a fine pigment grade red iron oxide. It is also preferred to add a binder precursor to the physical mixture of the iron-containing compound and the zeolite and to form the physical mixture. After the desired shape has been formed, the iron-contacted zeolite may be calcined or hydrothermally treated as is more fully described herein.

Alternatively, the iron may be incorporated into a zeolite which is prepared by in-situ crystallization of a preformed aggregate comprising seeds for the desired zeolite (e.g., ZSM-5), silica, a crystalline silicate, and a source of iron. Also, the in-situ formed zeolite may be iron impregnated after crystallization using one or more of the above described methods. Again, the in-situ formed zeolite may be calcined or hydrothermally treated as is more fully described herein.

As described above, the preformed aggregate used to prepare the in-situ formed zeolite typically comprises at least three inorganic components, zeolite (e.g., ZSM-5) seeds, a colloidal silica such as Ludox™ as available from DuPont, and a crystalline silicate. Optionally, the aggregate may also contain alumina. An iron-containing compound may also be added to the aggregate. The silicate can be a layered material or other crystalline component which is convertible, as a component of the aggregate, upon high temperature calcination and hydrothermal treatment to the desired zeolite. The layered silicates are also known as phyllosilicates and are divided into a number of groups and subgroups according to their structure and chemical composition. The six main groups are: kaolinite-serpentine, pyrophylite-talc, mica, chlorites, smectites-vermiculites, and polygorskites-sepiolites. The kaolinite-serpentine group is the preferred source of the crystalline silicate for the preparation of the aggregate; however, as mentioned previously, any layered silicate and many other crystalline silicates have utility in this area.

U.S. Pat. Nos. 4,522,705; 4,091,007; 4,800,187; and 5,254,322, incorporated herein by reference, disclose various methods for in-situ crystallizing zeolites, such as ZSM-5.

Third Zone

The exhaust gas leaving the second zone is directed through a third zone. The third zone comprises a second catalyst which, preferably, oxidizes at least some of any carbon monoxide or any hydrocarbons present in the exhaust gas to innocuous products. One type of catalyst that is suitable for this application is a synthetic or natural zeolite, or mixtures of zeolites, e.g. an intermediate pore size zeolite, or mordenite, TEA mordenite and faujasite, such as zeolite Y, REY, REHY, REX, and REHX. Zeolite Rare Earth Y (REY) is disclosed in U.S. Pat. No. 3,251,902 and Rare Earth X (REX) is disclosed in U.S. Pat. No. 3,210,267. Intermediate pore size zeolites (e.g. those having less than about 7 Angstroms pore size, such as from about 5 to less than about 7 Angstroms) have a Constraint Index of about 1 to about 12. Examples of such zeolites include ZSM-5 (U.S. Pat. No. 3,702,886 and Re. 29,948); ZSM-11 (U.S. Pat. No. 3,709,979); ZSM-12 (U.S. Pat. No. 3,832,449); ZSM-21 (U.S. Pat. No. 4,046,859); ZSM-22 (U.S. Pat. No. 4,556,477); ZSM-23 (U.S. Pat. No. 4,076,842); ZSM-35 (U.S. Pat. No. 4,016,245); ZSM-38 (U.S. Pat. No. 4,406,859); ZSM-48 (U.S. Pat. No. 4,397,827); ZSM-57 (U.S. Pat. No. 4,046,685); and ZSM-58 (U.S. Pat. No. 4,417,780). The entire contents of the above references are incorporated by reference herein. The method by which Constraint Index is determined is described fully in U.S. Pat. No. 4,016,218, incorporated herein by reference for details of the method. Particularly preferred is ZSM-5. The oxidation catalyst may function also to adsorb hydrocarbons. The oxidation catalyst may also be supported and may be used with a substrate as described above. The oxidation catalyst may be brought into contact with a monolithic ceramic substrate by crystallizing a zeolite on the surface of the substrate, as disclosed in U.S. Pat. No. 4,800,187, incorporated herein by reference. The oxidation catalyst may further be or contain a metal or metal compound, such as at least one of copper, zinc, vanadium, chromium, manganese, iron, cobalt, nickel, palladium, platinum, molybdenum, tungsten, lanthanum, ruthenium, rhenium, iridium, cerium and mixtures thereof, with the noble metals, platinum, palladium and combinations of these, along with cerium, particularly preferred. The oxidation catalyst may also be a noble metal, such as those mentioned above, on alumina, zirconia, titania, or combinations thereof, and further supported on a substrate, as described above, such as a monolithic substrate. Catalysts that are commercially available for the oxidation of volatile organic compounds may also be useful as the third zone catalyst. Catalysts containing platinum are useful to oxidize hydrocarbons and CO, e.g., platinum on alumina supported on a monolithic substrate. Again, the oxidation catalyst is substantially free of rhodium. The second catalyst may be different from the first catalyst because each catalyst fulfills different requirements, e.g., the first catalyst must be effective for both reduction of nitrogen oxides and oxidation of hydrocarbons and carbon monoxide where the second catalyst only needs to be effective for oxidation of hydrocarbons.

If a zeolite is used as the oxidation catalyst, the relative proportions of zeolite component and the support material in the oxidation catalyst on an anhydrous basis may vary widely with the zeolite content ranging from about 5 to about 99 percent by weight and more usually in the range of about 10 to about 80 percent by weight of the dry composite.

What is claimed is:

1. A process for continuously removing one or more nitrogen oxides, carbon monoxide, and hydrocarbons from the exhaust gas from an internal combustion engine, the process comprising a cold-start stage and a warm-running stage, wherein the cold-start stage comprises the steps of:

(a) passing the exhaust gas from a time beginning from the start of the engine into a first zone comprising a first catalytic material which is capable of simultaneously reducing the nitrogen oxides, oxidizing the carbon monoxide, and oxidizing the hydrocarbons, wherein the exhaust gas is contacted with the first catalytic material, during the cold-start stage, under reaction conditions during the beginning of the cold-start stage that are not sufficient to oxidize a majority of the hydrocarbons in the exhaust gas;

(b) passing the effluent from step (a) to a second zone comprising a sorbent material capable of sorbing hydrocarbons, wherein the effluent from step (a) is contacted with the sorbent under conditions sufficient to sorb hydrocarbons in the effluent from step (a), wherein the sorbent material comprises iron-containing ZSM-5 and iron-containing zeolite Beta, and wherein the sorbent material is hydrothermally treated prior to use in the process; and (c) passing the effluent from step (b) to a third zone comprising a second catalytic material which is capable of oxidizing hydrocarbons, wherein the cold-start stage transitions into the warm-running stage when the temperature in the first zone increases to a temperature sufficient to promote the oxidation of hydrocarbons in the first zone, the warm-running stage comprising the steps of:

(d) passing the exhaust gas from the engine into the first zone, wherein the exhaust gas is contacted with the first catalytic material under reaction conditions sufficient to (i) reduce nitrogen oxides and (ii) oxidize carbon monoxide, wherein the reaction conditions during the warm-running stage are sufficient to oxidize a majority of the hydrocarbons in the exhaust gas;

(e) passing the effluent from step (d) to the second zone, wherein the effluent from step (d) is contacted with the sorbent material under conditions sufficient to desorb at least a portion of the hydrocarbons sorbed on the sorbent during step (b); and (f) passing the effluent from step (e) to the third zone, wherein the effluent of step (e) is contacted with the second catalytic material under conditions sufficient to oxidize hydrocarbons desorbed from the sorbent in step (e).

2. The process according to claim 1, wherein the warm-running stage further comprises discontinuing the flow of the effluent from the first zone to the second zone, the flow being discontinued when a substantial portion of the sorbed hydrocarbons have been removed from the sorbent material.

3. The process according to claim 1, wherein the cold-start stage comprises passing the exhaust gas into the first zone, then to the second zone, then to the third zone in undiverted flow with no intervening valves, flow control means, or other flow impediments and wherein the warm-running stage comprises passing the exhaust gas into the first zone, then to the second zone, then to the third zone in undiverted flow with no intervening valves, flow control means, or other flow impediments.

4. The process according to claim 1, wherein air is injected into the second zone along with the effluent from step (a) during the cold-start stage and along with the effluent from step (d) during the warm-running stage.

5. The process according to claim 1, wherein the sorbent material of steps (b) and (e) consists essentially of said hydrothermally treated, iron containing ZSM-5 and hydrothermally treated, iron containing zeolite Beta.

6. The process according to claim 5, wherein the iron containing ZSM-5 has an iron loading of about 1.5 to about 3 percent by weight based upon the zeolite and the iron modified zeolite Beta has an iron loading of about 0.6 to about 1.5 percent by weight based upon the zeolite.

7. The process according to claim 1, wherein the iron containing ZSM-5 has an iron loading of about 1.5 to about 3 percent by weight based upon the zeolite and the iron containing zeolite Beta has an iron loading of about 0.6 to about 1.5 percent by weight based upon the zeolite.

8. The process according to claim 1, wherein the iron containing ZSM-5 or iron containing Zeolite Beta independently further contain at least one material selected from the group consisting of copper, chromium, manganese, cobalt, nickel, palladium, platinum, molybdenum, tungsten, sodium, potassium, magnesium, calcium, barium, cerium, mixtures thereof, and compounds thereof.

9. The process according to claim 1, wherein the iron containing ZSM-5 is prepared by a method selected from the group of ferrocene impregnation of ZSM-5, ion-exchange of ZSM-5 with an aqueous solution of a ferrous salt, impregnation of ZSM-5 by an aqueous solution of an inorganic iron-containing salt or salt-precursor, physical contact of ZSM-5 with an inorganic iron containing compound, and in-situ production of iron-containing ZSM-5 from a preformed aggregate.

10. The process according to claim 1, wherein the iron containing zeolite Beta is prepared by a method selected from the group of ferrocene impregnation of zeolite Beta, ion-exchange of zeolite Beta with an aqueous solution of a ferrous salt, impregnation of zeolite Beta by an aqueous solution of an inorganic iron-containing salt or salt-precursor, and physical contact of Zeolite Beta with an inorganic iron containing compound.

11. The process according to claim 1, wherein the first catalytic material of steps (a) and (d) comprises platinum, palladium, rhodium, alumina and ceria.

12. The process according to claim 1, wherein the second catalytic material further comprises a material which is incapable of reducing nitrogen oxides while it is oxidizing hydrocarbons and oxidizing carbon monoxide.

13. The process according to claim 1, wherein the second catalytic material comprises a natural or synthetic zeolite.

14. The process according to claim 13, wherein the second catalytic material further contains a material selected from the group consisting of copper, zinc, vanadium, chromium, manganese, iron, cobalt, nickel, palladium, platinum, molybdenum, tungsten, lanthanum, ruthenium, rhenium, iridium, cerium, compounds thereof, and mixtures thereof.

15. The process according to claim 14, wherein the second catalytic material is substantially free of rhodium.

16. A process for continuously removing one or more nitrogen oxides, carbon monoxide, and hydrocarbons from the exhaust gas from an internal combustion engine, the process comprising a cold-start stage and a warm-running stage, wherein the cold-start stage comprises the steps of:

(a) passing the exhaust gas from a time beginning from the start of the engine into a first zone comprising a first catalytic material comprising platinum, palladium, rhodium and alumina, which is capable of simultaneously reducing the nitrogen oxides, oxidizing the carbon monoxide, and oxidizing the hydrocarbons, wherein the exhaust gas is contacted with the first catalytic material, during the cold-start stage, under reaction conditions during the beginning of the cold-start stage that are not sufficient to oxidize a majority of the hydrocarbons in the exhaust gas;

(b) passing the effluent from step (a) to a second zone comprising a sorbent material comprising hydrothermally treated, iron containing ZSM-5 and hydrothermally treated iron containing zeolite Beta, wherein the sorbent material is hydrothermally treated prior to the use in the process, which sorbent is capable of sorbing hydrocarbons, wherein the effluent from step (a) is contacted with the sorbent under conditions sufficient to sorb hydrocarbons in the effluent from step (a); and (c) passing the effluent from step (b) to a third zone comprising a second catalytic material comprising natural and synthetic zeolites containing at least one material selected from the group consisting of copper, zinc, vanadium, chromium, manganese, iron, cobalt, nickel, palladium, platinum, molybdenum, tungsten, lanthanum, ruthenium, rhenium, iridium, cerium, compounds thereof, and mixtures thereof, which is capable of oxidizing hydrocarbons, wherein the cold-start stage transitions into the warm-running stage when the temperature in the first zone increases to a temperature sufficient to promote the oxidation of hydrocarbons in the first zone, the warm-running stage comprising the steps of:

(d) passing the exhaust gas from the engine into the first zone, wherein the exhaust gas is contacted with the first catalytic material under reaction conditions sufficient to (i) reduce nitrogen oxides and (ii) oxidize carbon monoxide, wherein the reaction conditions during the warm-running stage are sufficient to oxidize a majority of the hydrocarbons in the exhaust gas;

(e) passing the effluent from step (d) to the second zone, wherein the effluent from step (d) is contacted with the sorbent material under conditions sufficient to desorb at least a portion of the hydrocarbons sorbed on the sorbent during step (b); and (f) passing the effluent from step (e) to the third zone, wherein the effluent of step (e) is contacted with the second catalytic material under conditions sufficient to oxidize hydrocarbons desorbed from the sorbent in step (e).

17. The process according to claim 16, wherein the exhaust gas is passed from the first zone to the second zone and to the third zone in undiverted flow with no intervening valves, flow control means, or other flow impediments.

18. The process according to claim 16, wherein the sorbent material consists essentially of said hydrothermally treated iron containing ZSM-5 and hydrothermally treated, iron containing zeolite Beta.

* * * * *